March 15, 1955 S. V. COLLINS Re. 23,963
APPARATUS FOR LAYING AND RETRIEVING PIPE LINES
Original Filed July 13, 1950 7 Sheets-Sheet 1
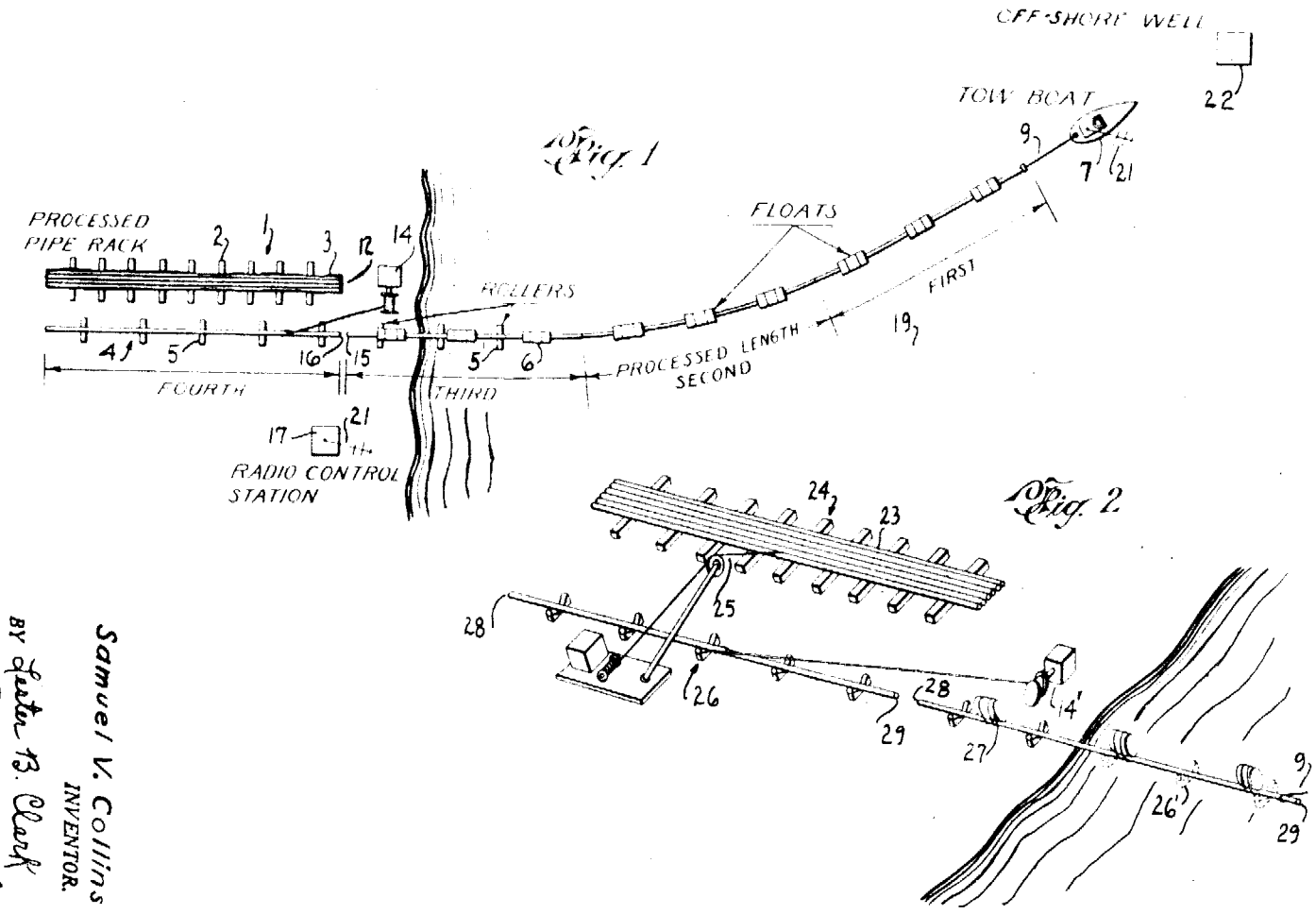
Samuel V. Collins
INVENTOR.
BY Lester B. Clark
& Ray L. Smith
ATTORNEYS March 15, 1955 S. V. COLLINS Re. 23,963
APPARATUS FOR LAYING AND RETRIEVING PIPE LINES
Original Filed July 13, 1950
7 Sheets-Sheet 2
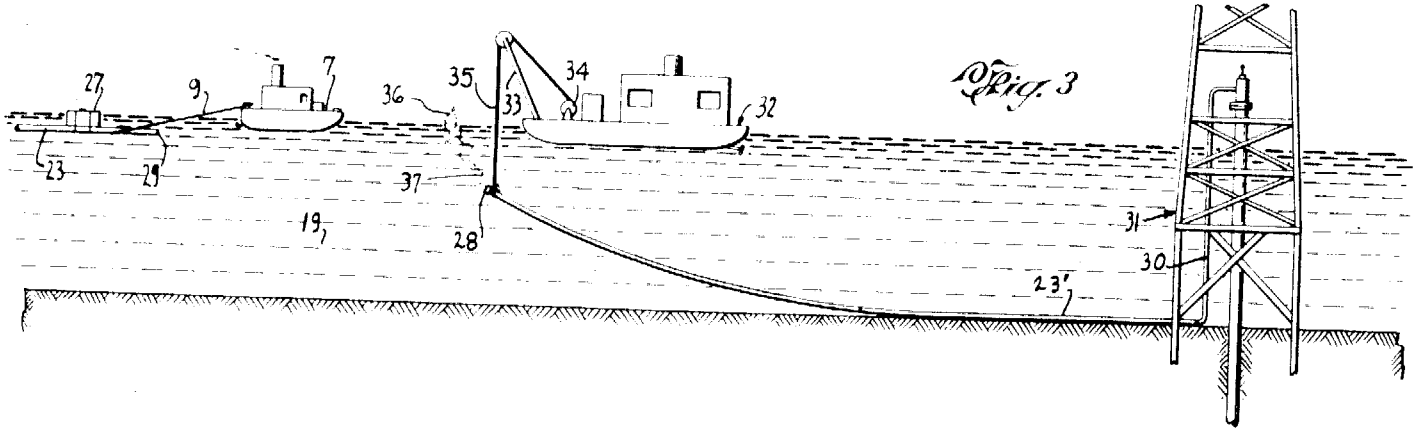
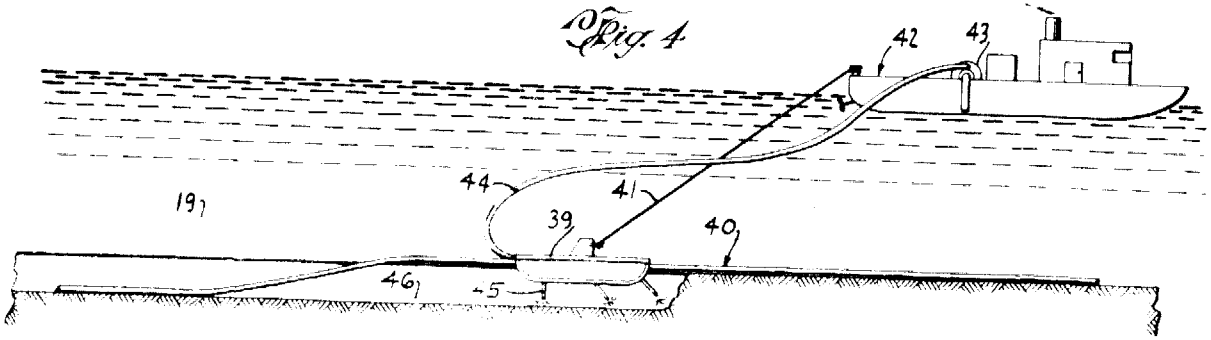
Samuel V. Collins
INVENTOR.
BY Lester B. Clark
+ Ray L. Smith
ATTORNEYS APPARATUS FOR LAYING AND RETRIEVING PIPE LINES
Original Filed July 13, 1950 7 Sheets-Sheet 3
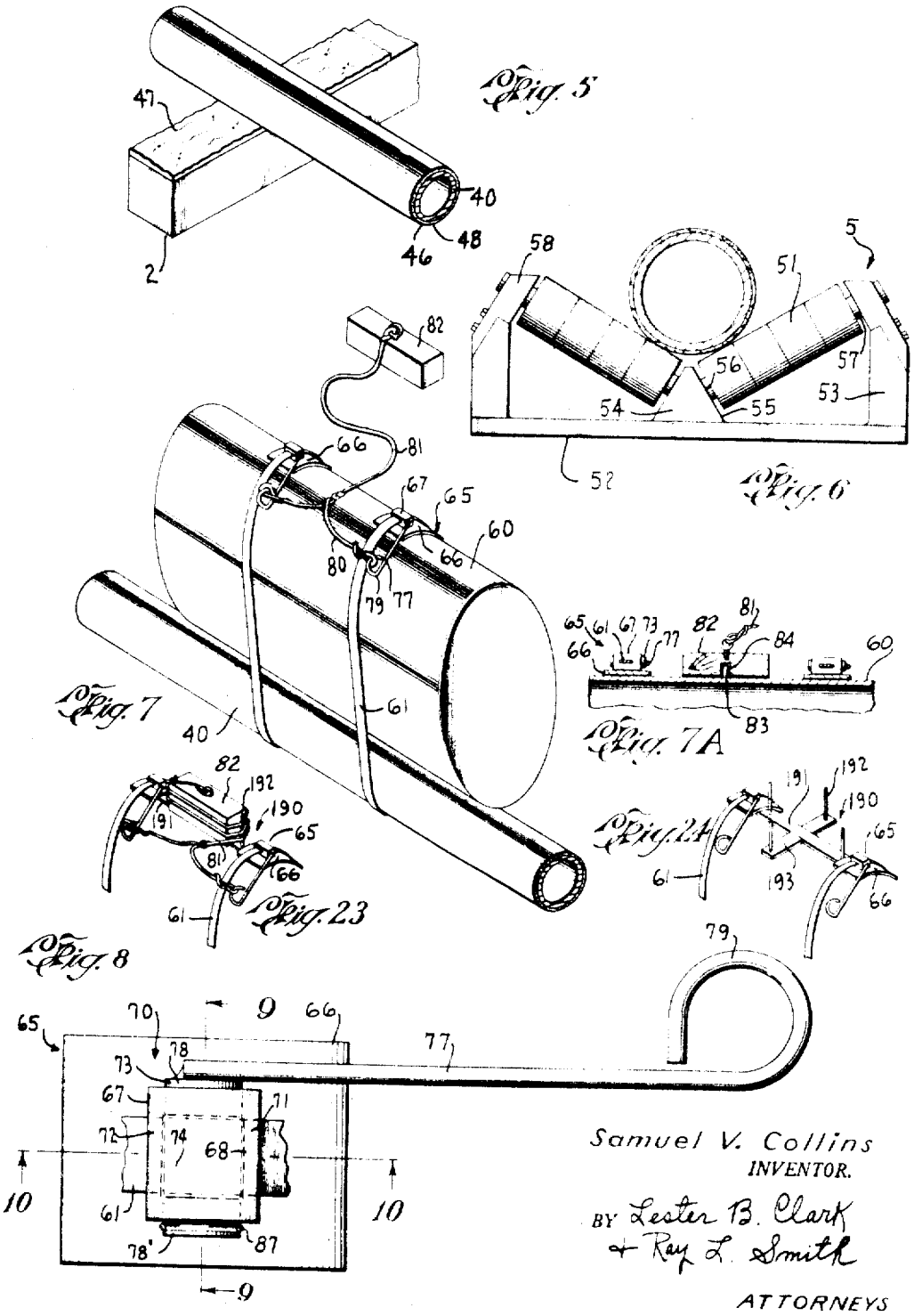
Samuel V. Collins
INVENTOR.
BY Lester B. Clark
& Ray L. Smith
ATTORNEYS

APPARATUS FOR LAYING AND RETRIEVING PIPE LINES

Original Filed July 13, 1950 7 Sheets-Sheet 4

Samuel V. Collins
INVENTOR.

BY Lester B. Clark
+ Ray L. Smith
ATTORNEYS

APPARATUS FOR LAYING AND RETRIEVING PIPE LINES

Original Filed July 13, 1950 7 Sheets-Sheet 5

Samuel V. Collins
INVENTOR.

BY Lester B. Clark
+ Ray L. Smith

ATTORNEYS

APPARATUS FOR LAYING AND RETRIEVING PIPE LINES

Original Filed July 13, 1950 7 Sheets-Sheet 6

Samuel V. Collins
INVENTOR.

BY Lester B. Clark
+ Ray L. Smith
ATTORNEYS

APPARATUS FOR LAYING AND RETRIEVING PIPE LINES
Original Filed July 13, 1950 7 Sheets-Sheet 7
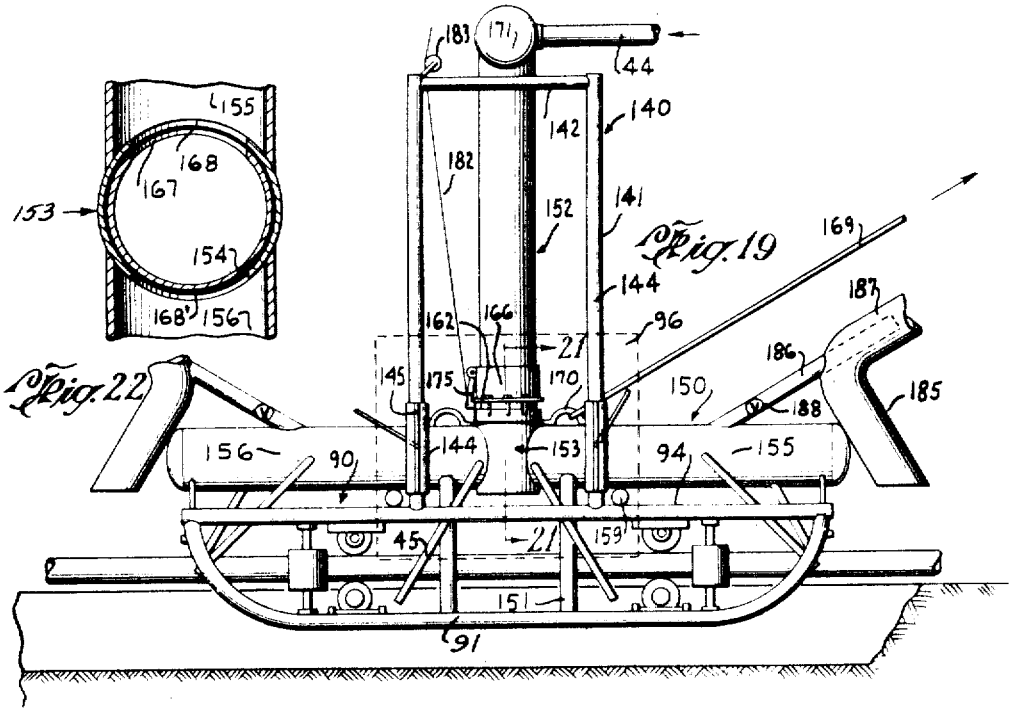
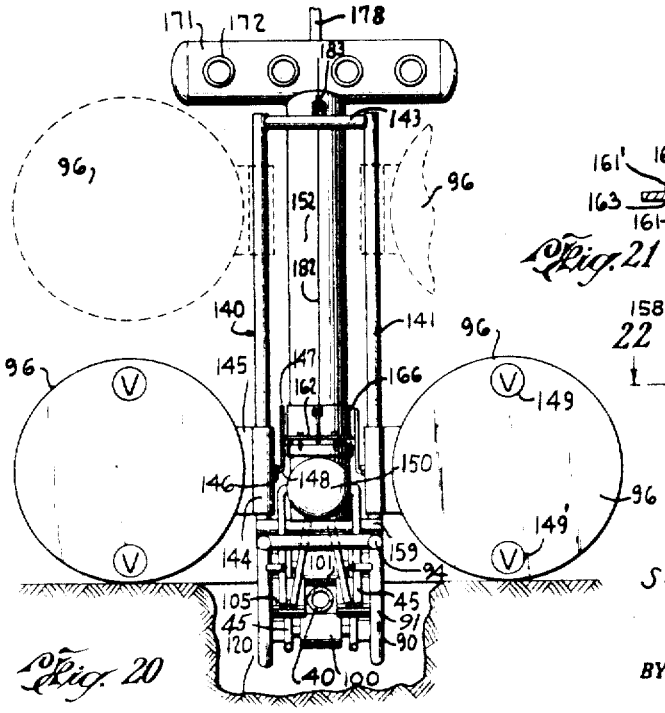
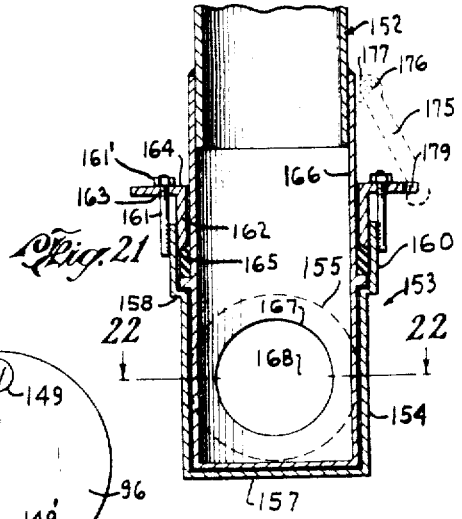
Samuel V. Collins
INVENTOR.
BY Lester B. Clark
+ Roy L. Smith
ATTORNEYS United States Patent Office Re. 23,963
Reissued Mar. 15, 1955

23,963

APPARATUS FOR LAYING AND RETRIEVING PIPE LINES

Samuel V. Collins, Port Lavaca, Tex.

Original No. 2,602,300, dated July 8, 1952, Serial No. 173,623, July 13, 1950. Application for reissue January 15, 1953, Serial No. 331,522

12 Claims. (Cl. 61—72)

Matter enclosed in heavy brackets [ ] appears in the original patent but forms no part of this reissue specification; matter printed in italics indicates the additions made by reissue.

This invention relates to a method of extending a pipe line to an off-shore location, as an oil well, and to extending such a pipe line across a body of water. It also relates to the method of entrenching a line thus extended in the floor beneath the body of water. Additionally it relates to a system and to the apparatus, devices, and equipment which may be employed by such system for accomplishing such extension and entrenchment.

It is an object of this invention to provide a novel method and inexpensive apparatus for quickly extending a pipe line from shore to a location upon, or across a body of water.

It is another object of this invention to provide a method and apparatus for thus extending a coated pipe line without injuring the coated surface thereof, and without admitting water inside the pipe line.

It is a further object of this invention to provide a method and apparatus for extending a pipe line from the shore to a near-by location or across a short expanse of water by adding sections of pipe to the line on the shore adjacent the launchway.

It is another object of this invention to provide a method and apparatus for extending a pipe line out to a remote location upon a body of water, or across a wide expanse of water, by towing floated pipe sections to sea and shore connecting such sections to the completed portion of the line.

It is a further object of this invention to provide a launchway for launching coated sections of pipe; such a launchway comprising a plurality of portable roller units which may be easily moved from one launching point to another.

It is a further object of this invention to provide a novel method of floating pipe sections at sea and also to provide the equipment therefor which may be easily disconnected from the line upon the water and recovered.

It is yet another object of this invention to provide a novel trenching machine which may be easily and removably installed along a pipe line, and which may be easily towed and operated to jet a trench upon the ocean floor into which the pipe line may sink.

It is still a further object of this invention to provide a trenching machine of this class which may have its direction of motion along the pipe reversed without the necessity of reversing the machine itself.

It is yet an additional object of this invention to provide a trenching machine of this class having a releasably locked swiveled and valved header connection so that jetting water may be shut off, or directed to either end of the machine.

It is also an additional object of this invention to provide a trenching machine of this class provided with a frame on which pontoons may be adjusted in elevation to regulate the trench depth which the machine may jet.

It is a further object of this invention to provide a trenching machine of this class provided with pontoons having air and water valve connections so that their buoyancy may be regulated.

It is still an additional object of this invention to provide a stadia means on the trenching machine to extend above the water level and indicate trench depth.

It is also an object of this invention to provide apparatus for, and methods of recovering pipe lines from under water by employing substantially the equipment employed to lay the line in substantially the reverse order to retrieve the line.

It is a further object of this invention to provide a launchway which extends substantially perpendicular to the shoreline at its point of contact therewith, and which has a series of padded, floatable dollies, either slidable or adapted to roll upon said launchway, so that process coated pipe may be launched and the dollies recovered from the water.

Other and further objects of this invention will be apparent when the specification is considered in connection with the drawings in which;

Fig. 1 is a diagrammatic plan view showing the method of extending a pipe line from shore to a near-by location as an off-shore well.

Fig. 2 is a perspective view showing a step in the launching of pipe sections which are to be floated to sea and welded at sea to the completed portion of the pipe line.

Fig. 3 shows the step following that shown in Fig. 2; in this figure the section being towed is shown approaching the completed portion of the line while the completed portion of the line is being raised so that the towed sections may be connected thereto.

Fig. 4 shows the operation of entrenching a sunken pipe line into the ocean floor.

Fig. 5 is a perspective view showing the coated character of the pipe sections employed in pipe lines and this view also shows the necessity for padding supports, such as launchways, to protect the coated pipe.

Fig. 6 is an elevation of a roller unit employed in one type of launchway.

Fig. 7 is a perspective view showing a float connected to a pipe section.

Fig. 7A is a fragmentary sectional elevation showing one means of maintaining the band clipper float block on a float barrel until the float block is in contact with the water.

Fig. 8 is a plan view of a band clipper employed on floats to sever the bands connecting them to the pipe line when it is desired to sink the pipe line to the ocean floor.

Fig. 19 is a side elevation of a preferred modification of the trenching machine.

Fig. 20 is an end view of the machine shown in Fig. 19.

Fig. 21 is a sectional elevation taken along line 21—21 of Fig. 19.

Fig. 22 is a sectional plan view taken along line 22—22 of Fig. 21.

Fig. 23 is a perspective view, with barrel omitted, showing another modification of a means for maintaining the band clipper float block on the float barrel.

Fig. 24 is a perspective view showing a modification of the means shown in Fig. 23.

Figure 10:
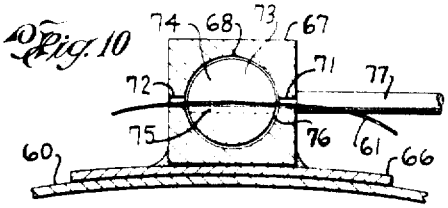
Fig. 10 is a sectional elevation taken along line 10—10 of Fig. 8.

In conventional methods of launching pipe heretofore employed, the pipe has usually been launched sideways, requiring that a pier be found, or a substantially long, straight stretch of shore line on which a sidewise launchway may be built. Also, great difficulty has been experienced in floating pipe sections at sea, and usually a multiplicity of tow boats or tugs have been required. In cases where float means have been connected to pipe sections, great difficulty has also been encountered in disconnecting the float means when it has been desired to sink the pipe, and additional difficulties and losses have resulted in endeavoring to recover the float means. Further difficulties have also arisen when it has been endeavored to sink the pipe into the ocean floor when awkward dredging equipment has been employed to form the trench into which the pipe is to be placed. The system of equipment covered by this invention, and the methods employed, set out to remedy these enumerated difficulties and other obvious ones inherent to the art of extending pipe lines over bodies of water to be entrenched into the floor therebelow.

As shown in Fig. 1, a pipe rack 1 is provided comprising spaced apart support members 2 forming a line preferably perpendicular to the shore. Sections of processed pipe 3 may then be assembled upon, or brought to the pipe rack. Adjacent the pipe rack 1, and extending parallel thereto, the launchway 4 is provided. As shown, this launchway comprises spaced apart rollers 5 to be hereinafter described. A pipe section 3 is then moved from rack 1 to launchway 4 and float means 6 are connected thereto at spaced apart intervals. The seaward end 16 of the section is then plugged.

The pipe section 3, with floats attached, is then moved axially seaward upon the line of rollers 5' which extends into the water. The section is launched far enough, in this manner, to permit a towing means, as a tow boat 7, to attach a towing line 9 thereto. The tow boat then tows the section seawardly in the desired direction, until the landward end 11 of the pipe section 3 is adjacent the seaward end 12 of the racked pipe. The winch 14 is provided to handle the pipe sections 3, and such is shown being used to bring the seaward end 16 of a section on the launchway 4 into abutment with the landward end 15 of the preceding launched section.

To contol the movement of the pipe by the tow boat 7, vocal control is first used from the control station 17 ashore, so that the pipe end 16 and pipe end 15 may be kept adjacent each other for alignment, abutment, and welding. It is thus apparent that the director on shore must closely observe the ends 15 and 16 and that he must communicate timely with the tow boat operator who responds promptly to stop the tow boat.

When the ends have been abutted and welded, and the coating replaced and completed about the welded joint, the tow boat is then ready to proceed to tow the pipe line seawardly until the end 15 of the section just added is adjacent the end 12 of the rack 1.

When this process has continued until the tow boat 7 is out of vocal communication range, communication may then be conducted by radio, both the control station 17 ashore and the tow boat 7 being equipped with transmitting and receiving sets 21. This method of communication may then be used until the pipe line 20 is extended to location, as to the other side of the body of water 19, or to an off-shore well 22. When the pipe line has been extended to desired location, and it is desired to sink the line to the floor beneath the body of water, the float means 6 are disconnected from the line and are retrieved. The method of accomplishing this will be set forth hereinbelow.

In cases where the off-shore location, or the body of water to be traversed, comprises too great a distance for handling pipe by the above described method, the method of Figs. 2 and 3 may be employed. In this method, pipe sections 23 usually of considerably greater size and length than the sections 3, are assembled or positioned on the rack 24, and are handled therefrom by the cat line 25 and moved onto the launchway 26. Then float means 27 are connected to the pipe section and both the inboard end 28 and outboard end 29 is plugged, and the section is launched down the launchway extension 26' until a towing line 9 from the tow boat 7 may be connected to the outboard end 29. The winch 14' is provided for handling the pipe in launching.

The tow boat 7 then tows the floated pipe sections to sea as indicated in Fig. 3, the first section 23' being connected by conventional means and methods to a location, as to the riser 30 of the offshore well 31. Subsequent sections are added by the method shown in Fig. 3 whereby a craft 32 equipped with a boom 33, winch 34, and handling line 35 as shown, is employed to lift the end 28 of a pipe section, to be aligned with the end 29 of the approaching section 23, towed by the tow boat 7, so that the ends, after being unplugged, may be welded together and the uncoated surface about the welded joint coated while held out of the water 19.

After this occurs the float means 27 are detached from the newly added section so that it may sink into the water. The float means are then recovered for further use as will be hereinafter described.

In every case where it is desired to release the craft 32 from its purchase on the pipe line, a buoy or marker 36 is connected to the end 28 of the added section, by a line 37 of greater length than the depth of water at that point. Thus the floating marker indicates to the crew of the craft 32 the next point at which they are to connect to the pipe line end to be raised.

After a pipe line has been completed by either of the methods hereinabove described, it is desirable to sink the pipe into the earthen floor beneath the body of water 19. This is accomplished by installing a trenching machine 39 around the pipe line 40 to be towed by the line 41 connected to the machine from the craft 42.

This craft 42 also has pumping means 43 thereon to pick up sea water and pump it down the hose 44 to be jetted from the trenching machine jets 45 to dig the trench 46 into which the pipe settles behind the machine 39. As the jetting of water generally stirs up the loose bottom of the floor, it happens that the sediment and earth thus stirred up, will settle back over the pipe line in the trench to bury it.

The pipe 40 employed, as shown in Fig. 5, is generally coated by a material, as bitumen 48, and is also wrapped by a material as felt, wrapping paper, or a suitable water proof material 46. For this reason the rack members 2 should preferaby have the pads 47 thereon to protect the coating from indentations in handling. For the same reason the launchway roller elements 51 of the rollers 5 are of a soft material, preferably rubber.

The individual portable rollers 5 may be put down to direct a launchway along any directional line or at a desired curvature. Such a roller has the base 52 which has the uprights 53 on opposed sides thereof. Centrally on the base 52 between the uprights, there is affixed the wedge member 54, the sides 55 of which have bores 56 therein; these bores are adapted to furnish the journals for the shafts 57 on which the rubber roller elements 51 are affixed to rotate with these shafts.

The upper ends of the shafts are journalled in the bearing members 58, which may be adjustably positioned on the uprights 53. Such adjustment may be obviously accomplished, as by providing a conventional ball bearing unit, not shown, which may be mounted in a conventional ball and socket joint, also not shown, such a construction being installed at either the wedge end or the bearing member end of each shaft.

The floats 6 and 27 have as their buoyant element the water tight barrels 60. These barrels are installed on top of the pipe 40 by means of the bands 61 which extend around the pipe and a side of the barrel, and then pass through the band clipper 65 for connection, by conventional means, with the band portion around the other side of the barrel.

The band clipper 65 has a base 66 which is preferably curved in one direction to conform with the curvature of the barrel. A block 67 is connected centrally of the base 66 and has the bore 68 therethrough transversely of the curvature of the base. The base 66 and block 67 together constitute the band clipper housing 70. The housing has the opposed slots 71 and 72 through the walls thereof and parallel to, and on substantially the same horizontal plane as, the bore axis.

Figure 9:
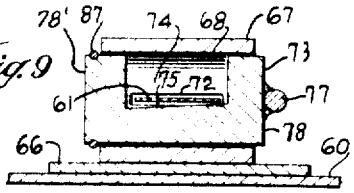
Fig. 9 is a sectional elevation taken along line 9—9 of Fig. 8.
Figure 11:
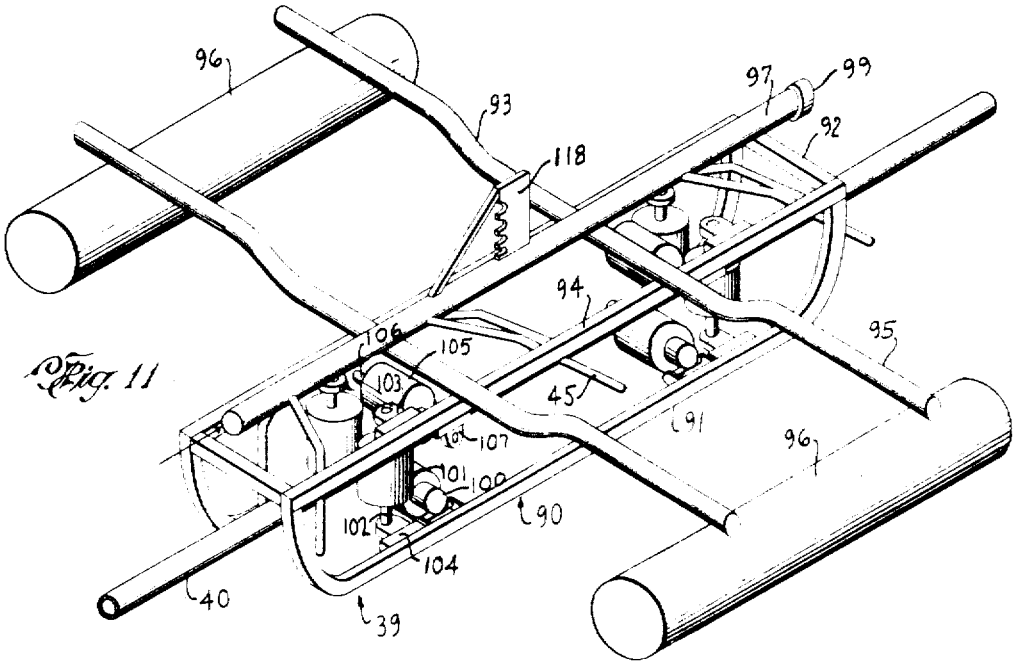
Fig. 11 is a perspective view of one modification of an entrenching machine.
Figure 12:
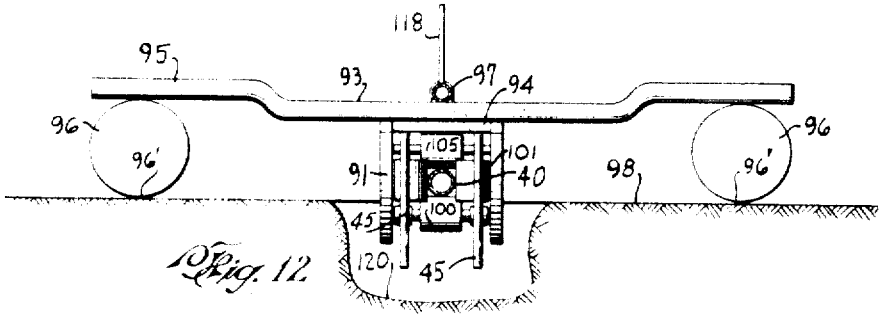
Fig. 12 is an end view of the machine shown in Fig. 11.
Figure 13:
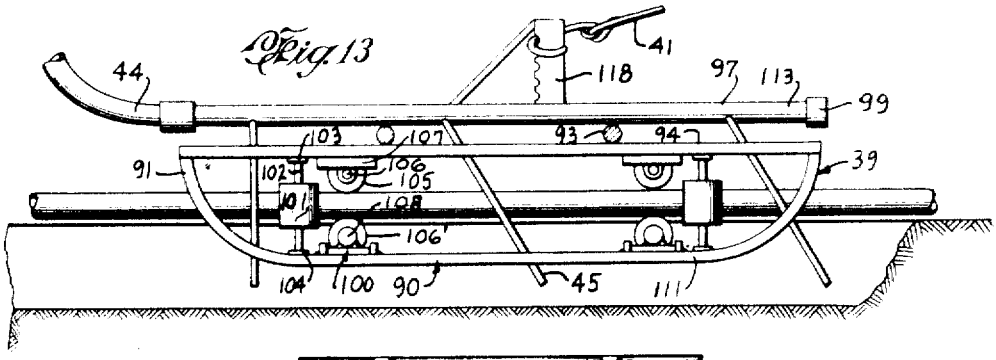
Fig. 13 is a side elevation of the machine shown in Fig. 11.
Figure 14:
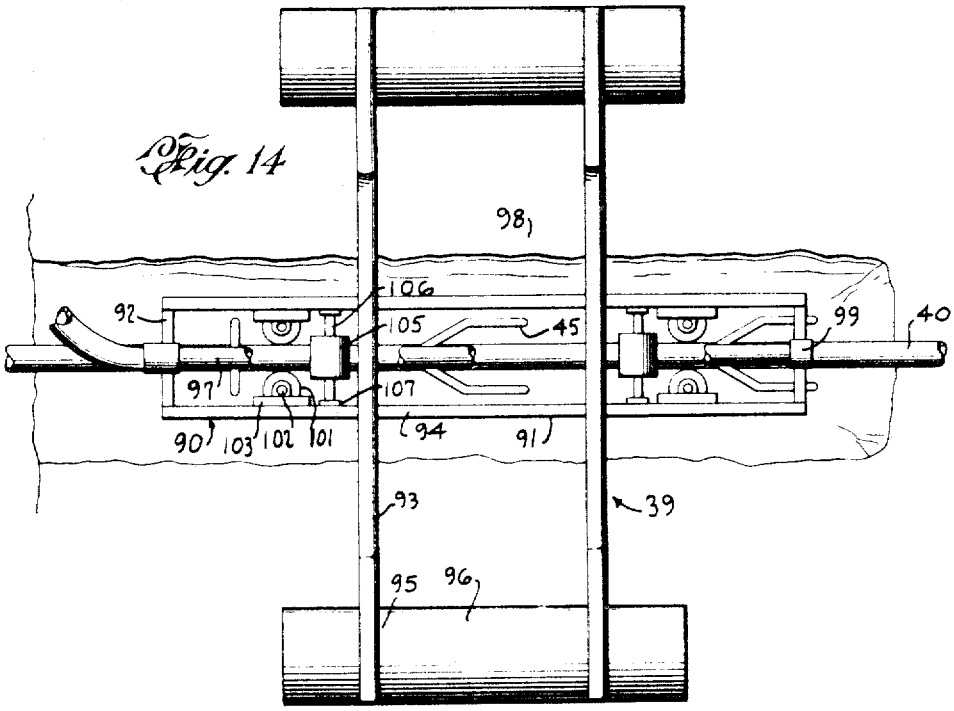
Fig. 14 is a plan view of the machine shown in Fig. 11.

A cylinder 73 is provided to fit within the bore 68, such cylinder being cut away centrally at 74, as shown in Fig. 9, for a length slightly greater than the length of the slots 71. The cut away section 74 extends below the horizontal plane of the bore axis, and terminates in a surface 75, tapered axially to provide a sloped shearing edge 76 for positively shearing the band 61 when the lever 77, connected to the cylinder end 78 transversely of the cylinder axis, is pulled upwardly. The opposite cylinder end 78' has the retaining ring 87 thereon to hold the cylinder 73 in place on the block 67.

Each lever 77 has the curved end 79 into which a line 80 may be tied. These lines 80 join a common line 81 which is connected to a float block 82, of wood or similar buoyant material. The line 81 is of a predetermined length, dependent upon the fathomed depth of water, so that the block 82 will float on the surface when the pipe 40 is submerged.

Figure 7B:
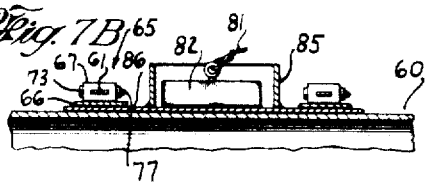
Fig. 7B is a fragmentary sectional elevation showing a second modification of a structure for maintaining a float block on a float barrel until the block floats on the water.

To maintain the float block 82 on top of the barrel 60 until it floats thereabove, and thereby prevent it from interfering with the launching operation by dangling beside the barrel, various means may be employed. As shown in Fig. 7A, a lug 83 may be welded onto the barrel 60 to fit within a hole 84 in the float block. Optionally, a receptacle 85 may be provided, which has an arm 86 extending on either side thereof to be held beneath a clipper 65 as shown in Fig. 7B.

In the modification of trenching machine shown in Figs. 11–14 the frame *or carriage assembly* 90 of the machine 39 includes two vertically extending skid members 91 cross-connected by transverse members 92 and two centrally extending transverse elements 93 which are connected to the top 94 of the frame. At each outer end 95 of these elements 93 a pontoon 96 is connected to lend buoyancy and *act* as a stabilizer *against roll of the carriage from upright position* so that a pontoon extends parallel to the frame in spaced relation on each side thereof. These pontoons are of a size and diameter to extend below the members 93 so that the bottoms 96' thereof rest on a horizontal plane 98 substantially below the frame top 94.

The frame 90 includes a header 97 which extends longitudinally of the frame 90 and which is connected to the transverse members 93. The header 97 has an upright bracket 118 thereon adapted to have a tow-line 41 connected thereto at a multiplicity of positions.

Parallel jets 45 extend downwardly and forwardly from the forward and central portion of the header 97 and a pair of parallel jets 45 also extend substantially vertically downwardly from the rear portion of the header. The forward end of the header has a cap 99 thereon and the rear end of the header is adapted to have a hose 44 connected thereinto.

To adapt the trenching machine 39 to have the pipe line 40 extended therethrough, the bottom roller assemblies 100, to be hereinafter described, are omitted from the machine and the machine is placed over the pipe line. The side rollers 101, have the shafts 102 mounted in the upper and lower journal blocks 103 and 104 on each side of the frame 90 to operate inwardly of the frame sides. The upper rollers 105 have the shafts 106 which are mounted to rotate in the journal blocks 107 on either side of the frame at the top thereof and extending below the top.

Figure 15:
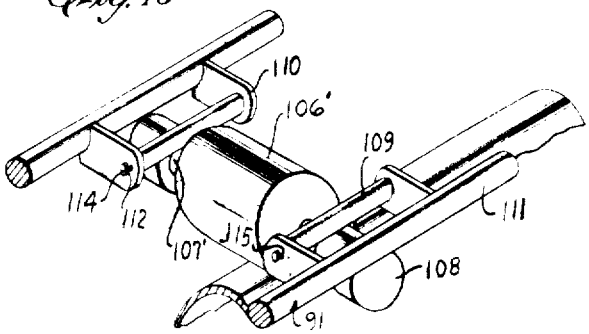
Fig. 15 is a bottom view showing the construction and assembly of the lower rollers to complete the entrenchment of a pipe line by an entrenching machine.

After the machine is positioned over the pipe line, a bottom roller assembly 100 is assembled to the frame below, and oppositely disposed to, each upper roller 105. Each assembly 100 comprises a roller 106' which has its shaft 107' journalled in the cups 108 at either end thereof, as shown in Fig. 15.

These cups are connected, as by welding, to sleeves 109 which extend transveresly of the cup and shaft axis. These sleeves 109 are substantially equal to or slightly less than the distance between the adjacent surface of the spaced apart vertically and inwardly extending plates 110 which are connected to the lower portion, or runner 111 of the skid 91. These end plates 110 have horizontally extending aligned bores 112 therein through which the bar 114 may be inserted, and also inserted through the sleeve 109, thereby completing the connection of roller assembly to frame. Cotter pins or other expedients 115 are provided to be passed through the ends of the bar 114 outwardly of the plates 110, to maintain the roller unit connected to the frame 90.

When these roller assemblies 100 are thus installed the rollers 106' contact the lower surface of the pipe 40 to abet the upper rollers 105 and side rollers 101 *to constitute pipe tracking devices* in guiding the machine along the pipe line.

Figure 17:
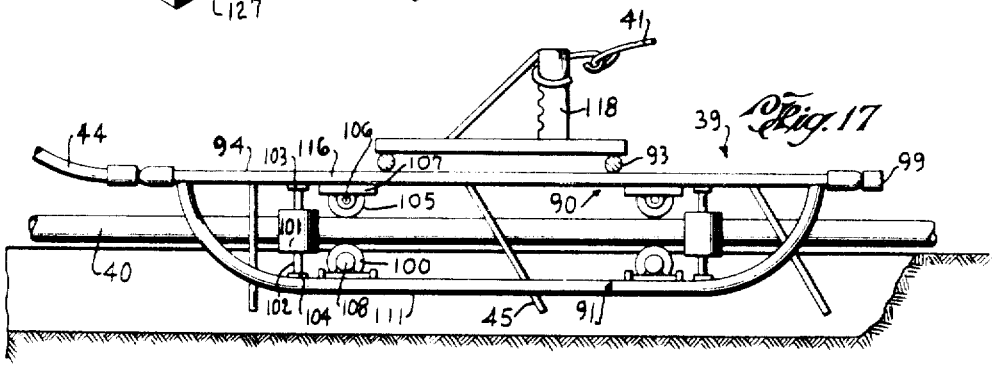
Fig. 17 is a side elevation of a modified trenching machine.
Figure 18:
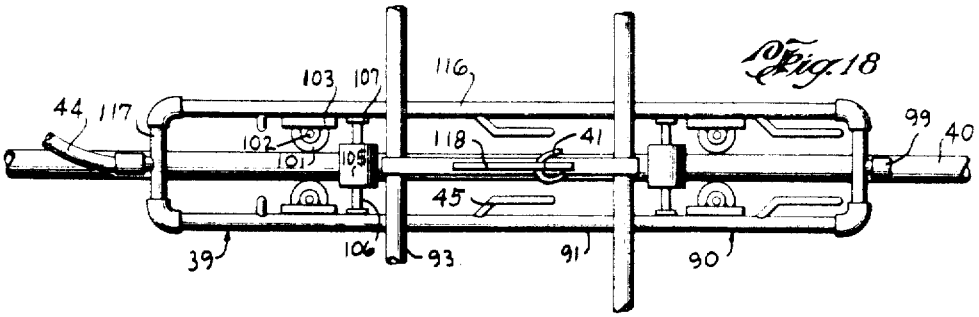
Fig. 18 is a plan view of the machine shown in Fig. 17.

An optional construction of trenching machine 39 shown in Figs. 17 and 18, shows a frame *90* [40] in which at least the top frame members 116 and 117 are hollow to provide the header means. With such a header the hose 44 may be connected into the cross member 117 centrally thereof and the jets 45 may extend downwardly from the top members 116.

The jets 45 extend below the bottoms 96' of the pontoons 96 a distance so as to expel the water pumped therethrough to jet out, or dig a trench of a depth to insure that the pipe line 40 may be sunk to a desired depth below the floor 98. The exact occurrences during the performance of jetting a sub-aqueous trench cannot be photographed. However the results accomplished are known, as by divers. It is clear that the jets 45 emulsify the sediment on the floor and cut away the harder earthen formation below, and that such dislodged matter rises into the water. However, as the trenching machine passes on such matter again settles back, to a great extent, and covers the pipe 40 which sinks to the bottom of the trench 120 behind the machine 39, as the machine passes the pipe line.

The skids 91 serve for skid purposes before the jets 45 are installed, and they serve as stabilizers before the pontoons 96 are on the bottom. Before the trench 120 is dug to deepest and widest extent shown in Fig. 12, the skids 91 at first ride upon a ledge of sediment and formation before it is washed away, and in this manner, in addition to acting as stabilizers, they serve both as skids and guides.

When the trenching machine reaches a location where it is necessary to disconnect it from the pipe line 40 below the water, as when, in Fig. 3, it may approach the foot of the derrick of the well 31, the trenching machine may be released by sending down divers to remove the cotter pins 115 from the bars 114. As the distance between the outer end of the cups 108 is less than the distance between skids 90, the roller assembly 100 may be pivoted about one bar 114 which may still be in place while the other bar 114 has been removed.

Additionally this shorter over all transverse length of the roller assembly 100 makes it more easily removable from below the trenching machine. When the roller assemblies 100 have been disconnected from the machine 39, the buoyancy of the pontoons 96 causes them to assist or to effect the raising of the trenching machine.

Figure 16:
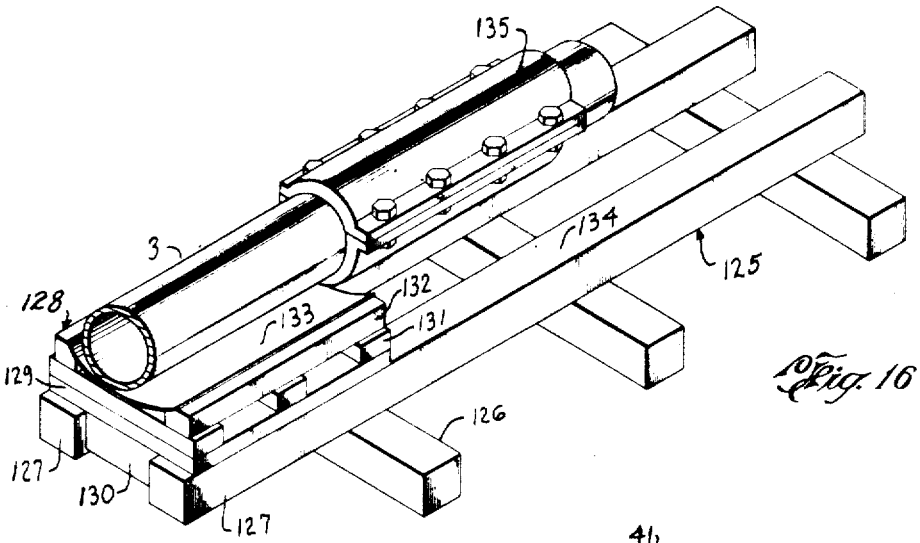
Fig. 16 is a perspective view showing a portion of one modification of launchway.

Whereas the launchway 4, comprised of a plurality of roller units 5, provides the most flexible type of launchway and one which is easily transported from point to point, this invention also considers a more permanent launchway as shown in Fig. 16, but which yet is less expensive and elaborate than any conventional side launching structures heretofore employed.

Such launchway 125 comprises cross-ties 126 upon which two parallel extending, spaced apart runways 127 are mounted. Dollies 128 are provided to receive the pipe section 3 thereon, each dolly comprising a base 129 having a guide block 130 connected centrally thereto to extend below into the space between runways 127 to guide the dolly. The transverse members 131 support thereabove the longitudinal members 132, and together these members support a pad 133 to protect the coated pipe section 3.

To launch pipe sections 3 on a launchway 125 it is usually necessary to grease the runways 127, as with crushed bananas, to lessen the frictional contact between dollies 128 and the runway top surfaces 134. It is also often found necessary to weight the pipe section 3 with weights, as 135, to insure that it moves down the launchway. A noticeable feature of this type of launchway comprises the fact that the dollies are floatable and therefore recoverable from the water after launching.

Optionally, a type of dolly not shown in the drawing may comprise dollies having pads 133 mounted on conventional bases, and supported by wheels which roll upon the runways 127, there being guide blocks 130 provided beneath the bases to maintain the dollies on the runways.

As a feature of this invention it is pointed out that each pair of band clippers 65 and the lines and blocks connected thereto may be recovered. It is simply necessary to direct a craft along a pipe section to be sunk, and an operator therein has only to lift up on the block 82 to cause each band clipper 65 to sever a band 61. The entire band clipper and float block assembly may then be lifted into the craft and retrieved for future use.

The barrels 60 are also easily retrieved as they can be grappled and brought aboard the craft as soon as they rise to the surface after the severing of the bands 61.

The trenching machine is not limited to these disclosures described hereinabove and a preferred embodiment is shown in Figs. 19–22. This modification has a frame 140 comprising four posts 141 extending above the top 94 of the jetting frame 90; these posts 141 being interconnected at their tops by the horizontal members 142 and 143.

Sleeves 144 are installed on the posts 141 and have webs 145 thereon which form connection members for the pontoons 96. Each sleeve has a nut 146 welded thereon and is threaded through co-axially with the nut. A set screw wrench 147 is provided for each sleeve, such wrench having a threaded end 148 to be threaded into the nut 146 to lock each sleeve 144 against its post 141 at any desired elevation. The air valves 149 and the water valves 149' are provided to regulate the buoyancy of the pontoons 96. As shown most clearly in Fig. 20, the regulating of the position of the pontoons 96 on the posts 141 determines the depth of the trench 120. *That is to say, when selected trench depth is finally reached with the pontoons bottoming on the floor of the body of water, further jetting action will become substantially ineffective. During the back and forth trenching operation and particularly for a relatively deep trench and before desired trench depth is reached, the pontoons may be at a height considerably above the floor level, as illustrated by the broken line positions in Fig. 20, and their buoyancies in co-operation with the surrounding water stabilize the carriage against roll or angular tilt about the pipe line 40 to maintain the carriage upright and the jet nozzles downwardly directed to a confined working zone.*

Trenching machines of this type include as part of the frame 90 a header 150 which is supported from the frame 90 by the uprights 151 and horizontal members 159. The header also includes an inlet swivel 152 which is pivotally connected to the journal member 153 which forms the central element of the header 150. As shown in Fig. 21, the journal member 153 includes the cylindrical member 154 which is cut away to receive for rigid connection the inner ends of the forward and after header portions 155 and 156. The base plate 157 closes the bottom of the member 154, and the flange 158 is provided at the top thereof.

The stuffing box housing 160 is rigidly connected to the flange 158 and has the studs 161 welded at radially spaced intervals to the outer periphery thereof. The gland 162 has the holes 163 radially spaced in the flange portion 164 to receive the studs 161 so that the nuts 161' may be tightened thereon and the packing 165 compressed between the gland 162, the housing 160, and the bearing flange 165' of the swivel bearing 166 to seal the bearing surfaces from fluid from above while still permitting rotation of the swivel 152.

The swivel bearing 166 has the port 167 therein which opens co-axially with the port 168 in the cylinder 154 when the trenching machine is being towed in the direction indicated by the arrow adjacent the tow line 169, the tow line 169 being tied into the connection hook 170 on the header 150.

When traveling in this direction water is pumped through a single hose 44 or a plurality thereof, to the manifold 171 at the top of the inlet swivel 152. A plurality of connection flanges 172 are provided, as it often happens that it proves more efficient to pump from a plurality of small pumps on the towing vessel 42, or on a separate pumping vessel, not shown in the drawings.

With the machine traveling as shown, the after portion of the header 156 is blocked off and all the jetting fluid pumped is directed through the ports 167 and 168, the port 168' being closed by the wall of the cylinder 154, as shown in Fig. 22.

In order to prevent the inlet swivel 152 from rotating, the locking arm 175 is provided which is pivoted on the pin 176 in the bracket 177 on the swivel bearing 166 and engages in a slot 179 in the gland flange 164. When it is desired to reverse the direction of travel of the trenching machine, in order to permit the inlet swivel to rotate, the line 182 is pulled upon to pivot the arm 175 upwardly.

As shown in Fig. 19 this line 182 extends through the pulley 183 to the surface of the water. A similar pulley may be located similarly on the opposite side of the frame 140 to release the arm 175 at the end of the opposite direction of machine travel. After the direction of travel has been changed, and the swivel 152 has been rotated 180°, the port 167 communicates with the port 168', and all jetting fluid pumped goes through the header portion 156 and its jets 45. Then the arm 175 may be placed to lock in a slot 179 in the gland flange diametrically opposite the first slot 179. *The arrangement enables adjustment from above the water surface and without disconnection of the submerged machine from the pipe line whenever trencher travel direction is to be reversed, as will be required for making several passes back and forth by the jets for removal of floor material to a specified trench depth.*

In this modification of machine described immediately hereinabove, it is obvious that the header, in the technical sense of the word, includes both the body hereinabove termed the header 150, and the tubular member hereinabove termed the swivel 152, and which includes by connection the manifold 171, and thus properly includes the fluid container between the inlet and dispersal thereof.

In the trenching process it may often occur that heavy formation particles, coral, oyster shell, mud, and the like may tend to clutter the trench being excavated, and pile up at the end thereof. To remove such material an L-shaped tube 185 is connected to either end of the header 150 and a smaller tube or pipe 186 is extended from the header and rigidly connected to extend within the upper leg 187 of the L-shaped tube.

The operation of the L-tube, when employed, is obvious, as the fluid pumped through the pipe 186 syphons the accumulated obstructing material upwardly and discharges it into the water thereabove. The valve 188 is provided to shut off the use of this tube 185 when trenching is being conducted where such is not needed.

A pipe 178, graduated as a stadia rod, may be installed on the manifold 171. This stadia rod can be read in terms of distance from the water level to the manifold, or to the bottom of the machine. The depth of trench being jetted in turn depends upon the distance from the bottom of the pontoons 96 to the bottom of the machine.

In addition to the means hereinabove described for maintaining the float blocks 82 on top of the barrels 60, a device 190 may be provided comprising a lath strip 191 having two nails 192 therein spaced apart a distance just greater than the length of the block. The line 81 is then wound lightly around the two nails 192 and the block. The ends of the lath are confined in assembly beneath the bases 66 of the band clippers 65.

An optional device of the same type includes a cross piece 193 also having nails 192 therein, and spaced apart a distance just greater than the width of the block 82. This device insures that the block 82 is not bound by the line 81 so that it readily floats when the barrel 60 is submerged therebelow in the water.

It is obvious that the same or similar types of equipment may be employed to remove a pipe line from beneath a body of water. In such case the trenching machine is first employed to loosen the formation thereabout and uncover the pipe. Then, with the line free and plugged at the end remote from the point to which it is to be returned, it is lifted at a point therefrom the length of a section to be floated. It is then severed above water and plugged and the line is allowed to sink to the bottom, a suitable marker being provided to float thereabove to locate the plugged end.

The section to be floated, now free and plugged at both ends, is supported from the surface, first at one end, until barrels can be installed a distance therealong. It may then be supported from the surface at successive points until finally enough barrels have been installed thereon to float the section so that it may be towed to the shore. The launchway provided for launching may then be employed to guide the section inboard. The barrels may be removed from the section ashore or on the water in the vicinity of the shore line. From the launchway, the section may be handled onto the rack. These steps are repeated until all the pipe line is ashore.

This invention broadly sets out to provide more efficient methods for extending pipe lines, usually consisting of processed or coated pipe sections, to off-shore locations and over bodies of water, and for entrenching such pipe lines in the floor beneath the body of water. The system of apparatus and various devices disclosed are within the scope of this invention, as are other structures which can carry out the methods disclosed.

Broadly, therefore, this invention considers both method and structure for launching pipe into the water substantially transversely of the shore line, to travel thereinto in a generally axially extending direction, and it considers therefor a launchway of portable units, and also a more permanent, yet portable launchway, constructed as an integral unit, and providing runways and recoverable dollies. It also considers the adaptation of nautical vessels for welding together pipe sections at sea. Additionally it considers a method of floating pipe lines, and float means and easily operable float severing means, both of which means are recoverable. It also considers an easily installed and removed trenching machine, inexpensively operated, to entrench the pipe line on the floor beneath a body of water.

This invention also broadly includes the use of the apparatus for extending pipe lines in a method of recovering extended pipe lines from below the bodies of water.

What is claimed is:

1. A machine for entrenching a sunken pipe line into the earthen floor below a body of water, said machine comprising a frame including a header adapted to have a pressurized fluid supplied thereinto, said frame being adapted to have a tow line connected thereto and being of substantial length with respect to the width thereof and being adapted to surround said pipe and to extend substantially longitudinally therealong, said header being of substantially the length of said frame, a plurality of oppositely disposed rollers connected to said frame at a plurality of longitudinally spaced apart locations along said frame, said rollers at each location extending within said frame to contact said pipe and to guide said frame along said pipe, stabilizer means connected to said frame and extending therefrom with the lowermost portions thereof at a higher level than the bottom of said frame, and jet nozzle means extending downwardly from said header adjacent said rollers and through which pressurized fluid supplied from *said line to* said header may be expelled to jet a trench in the earthen floor below said frame into which said pipe may sink behind said machine as said machine is towed along said pipe.

2. A machine as described in claim 1 in which said header comprises a tubular member mounted on top of said frame substantially centrally of the transverse width thereof with *its* longitudinal axis substantially parallel to the longitudinal axis of said frame.

3. A machine as described in claim 1 in which said header comprises a hollow portion of said frame.

4. A machine as described in claim 1 in which said header includes a body from which said jet nozzles extend and a tubular element into which said pressurized fluid is supplied, said tubular member being pivotally connected to said body substantially centrally, longitudinally thereof, said tubular element and said body providing cooperating valve elements to divert said fluid to either end of said body.

5. A machine as described in claim 1 which additionally includes a syphon means on said frame in fluid communication with said header and operable by fluid supplied thereinto from said header to divert at least part of the jetted formation particles away from said trench.

*6. A machine for entrenching a prelaid sunken conduit into the earthen floor below a body of water, said machine comprising a carriage for travel along said prelaid conduit, a header on the carriage adapted to have a pressurized fluid supplied thereinto, a plurality of pairs of conduit engageable tracking devices connected to said carriage with those of each pair being substantially diametrically opposed in relation to the conduit therebetween, and the pairs of tracking devices being spaced apart in the direction of carriage travel for contact with said conduit to guide the travel of said carriage along said prelaid conduit, buoyant stabilizer means connected to said carriage and extending therefrom with the lowermost portions thereof at a higher level than the bottom of said carriage, and jet nozzle means supported on the carriage to extend toward the floor from said header and through which pressurized fluid supplied from said header is expelled to jet a trench in the earthen floor below the conduit into which said conduit may sink behind said machine as said machine travels along said conduit.*

*7. A machine as described in claim 6 in which said header comprises a tubular member mounted on top of said carriage substantially centrally of the transverse width thereof with its longitudinal axis extending substantially in the direction of carriage travel.*

*8. A machine as described in claim 6 in which said header comprises a hollow portion of said carriage.*

*9. A machine for entrenching a prelaid sunken conduit into the earthen floor below a body of water, comprising a carriage for travel along said prelaid conduit, a header on the carriage for pressurized fluid, a plurality of tracking devices connected to said carriage at a plurality of locations spaced apart in the direction of carriage travel for contact with said conduit to guide and retain the carriage on said prelaid conduit, stabilizer means connected to said carriage and extended therefrom with the lower-most portions thereof at a higher level than the bottom of said carriage, jet nozzle means supported on the carriage to extend toward the floor and connected with said header, said header including a body from opposite ends of which said jet nozzle means extend and a tubular element into which said pressurized fluid is supplied, said tubular element being pivotally connected to said header body substantially centrally, longitudinally thereof, said tubular element and said header body constituting co-operating valve elements to divert said fluid to either end of said header body.*

*10. A trenching machine for entrenching a prelaid sunken conduit into the earthen floor below a body of water, said machine comprising a carriage, a header for pressurized fluid supplied thereinto, carriage supported guide means for engaging the conduit and retaining the carriage on the conduit, jet nozzle means on the carriage extending toward the floor to direct pressurized fluid from the header in jetting the trench in the floor below the prelaid conduit, said header including a body having said jet nozzles at opposite ends thereof and a tubular element through which said pressurized fluid is supplied to the body, said tubular element being pivotally connected to said body at a point between the jet nozzles at opposite ends thereof and co-operating therewith as a two-way valve element to divert said fluid for passage selectively through the jet nozzles at one or the other end of said body.*

*11. In a submarine conduit trenching machine of a type to be completely submerged in a body of water, a traveling carriage, downwardly directed fluid pressure trench digging jets supported by the carriage, conduit embracing guides on the carriage and a pontoon stabilizer projected from and in rigid relation with the carriage having buoyant co-operation with the surrounding water in which the carriage is submerged and maintaining the carriage upright and the carriage supported jets downwardly directed.*

*12. A trench jetting machine to be submerged in a body of water for travel on a submarine cable during a trenching operation on the floor of said body of water, including a traveling carriage having cable receiving guides to secure the carriage against displacement from the submarine cable and in tracking relation thereon, pressure fluid jetting nozzles on the carriage and through which pressure fluid is directed against the water body floor, and buoyant means to resist carriage roll around the cable axis, comprising a pair of carriage stabilizing pontoons secured on opposite sides of the carriage and above said pressure fluid jetting nozzles a distance to space the pontoons from the floor, at least in the initial stages of the trenching operation, and in buoyant co-operation with the water in which the carriage is submerged.*

References Cited in the file of this patent or the original patent

UNITED STATES PATENTS

| | | |
|---|---|---|
| 142,712 | McGroder et al. | Sept. 9, 1873 |
| 224,197 | Maguire et al. | Feb. 3, 1880 |
| 1,121,779 | Torseth | Dec. 22, 1914 |
| 1,265,631 | Drocar | May 7, 1918 |
| 1,339,502 | Doughty | May 11, 1920 |
| 1,495,704 | Mahlstadt | May 27, 1924 |
| 1,647,448 | Jones | Nov. 1, 1927 |
| 1,910,481 | Smith | May 23, 1933 |

(Other references on following page)

UNITED STATES PATENTS

| | | |
|---|---|---|
| 2,121,388 | Millan | June 21, 1938 |
| 2,144,063 | Irvin | Jan. 17, 1939 |
| 2,307,389 | Carter | Jan. 5, 1943 |
| 2,447,937 | Ellis et al. | Aug. 24, 1948 |
| 2,502,582 | Murphy et al. | Apr. 4, 1950 |
| 2,536,023 | Besner | Jan. 2, 1951 |

| | | |
|---|---|---|
| 2,538,365 | Jones | Jan. 16, 1951 |
| 2,659,211 | Notarbartolo et al. | Nov. 17, 1953 |

FOREIGN PATENTS

| | | |
|---|---|---|
| 601,925 | France | of 1925 |
| 694,195 | France | of 1930 |
| 555,954 | Germany | of 1932 |
| 705,470 | Germany | of 1941 |

UNITED STATES PATENT OFFICE

CERTIFICATE OF CORRECTION

Reissue No. 23,963 March 15, 1955

Samuel V. Collins

It is hereby certified that error appears in the printed specification of the above numbered patent requiring correction and that the said Letters Patent should read as corrected below.

Column 9, line 40, the words "said line to" should appear in square brackets instead of in italics.

Signed and sealed this 12th day of April, 1955.

(SEAL)

Attest:

E. J. MURRY

Attesting Officer

ROBERT C. WATSON
Commissioner of Patents